(12) United States Patent
Wu

(10) Patent No.: US 7,156,278 B2
(45) Date of Patent: Jan. 2, 2007

(54) AUXILIARY SOLDERING TOOL

(76) Inventor: Pi-Liang Wu, P.O. Box 55-124, Taichung (TW)

( * ) Notice: Subject to any disclaimer, the term of this patent is extended or adjusted under 35 U.S.C. 154(b) by 0 days.

(21) Appl. No.: 10/668,270

(22) Filed: Sep. 24, 2003

(65) Prior Publication Data
US 2005/0061851 A1    Mar. 24, 2005

(51) Int. Cl.
B23K 37/00 (2006.01)
B23K 5/22 (2006.01)
H05B 1/00 (2006.01)

(52) U.S. Cl. .................. 228/44.3; 228/19; 219/230; 269/254 R

(58) Field of Classification Search ............... 228/19, 228/44.3, 47.1, 51, 219; 219/161, 230
See application file for complete search history.

(56) References Cited

U.S. PATENT DOCUMENTS

| | | | | |
|---|---|---|---|---|
| 1,332,937 A | * | 3/1920 | Van Viersen ............... 228/44.3 |
| 2,139,499 A | * | 12/1938 | Howie .................... 219/161 |
| 2,477,467 A | * | 7/1949 | Rose ....................... 219/234 |
| RE24,020 E | * | 6/1955 | Kristen ...................... 228/19 |
| 3,149,015 A | * | 9/1964 | Lindsay .................... 156/502 |
| 3,291,476 A | * | 12/1966 | Calkin .................. 269/254 R |
| 3,307,258 A | * | 3/1967 | Hammeborg et al. ......... 30/261 |
| 3,980,861 A | * | 9/1976 | Fukunaga .................. 219/230 |
| 4,967,059 A | * | 10/1990 | Wagner .................... 219/230 |

\* cited by examiner

Primary Examiner—Lynne R. Edmondson

(57) ABSTRACT

An auxiliary soldering tool includes a first jaw plate having a first holding portion and a first holding portion, a second jaw plate having a second holding portion and a second holding portion, and two elastic press plates each respectively rested on the first holding portion of the first jaw plate and the second holding portion of the second jaw plate. Thus, the auxiliary soldering tool facilitates the soldering work of two wires, so that the worker can solder and connect the two wires easily and conveniently.

19 Claims, 3 Drawing Sheets

AUXILIARY SOLDERING TOOL

BACKGROUND OF THE INVENTION

1. Field of the Invention

The present invention relates to an auxiliary soldering tool, and more particularly to an auxiliary soldering tool that facilitates the soldering work of two wires, so that the worker can solder the two wires easily and conveniently.

2. Description of the Related Art

A conventional soldering tool can be used perform a soldering work to solder two juxtaposed wires so as to connect the two wires together. However, the two wires are not positioned efficiently, so that they are easily shifted by contact of the iron or soldering gun during the soldering process. Thus, one person has to hold the two wires by his two hands, and the other person has to hold the iron or soldering gun to solder the two wires, thereby causing inconvenience to the workers. In addition, when the person holds the two wires, his two hands are closer to the iron or soldering gun at a high temperature, thereby causing danger to the worker.

SUMMARY OF THE INVENTION

The present invention is to mitigate and/or obviate the disadvantage of the conventional soldering tool.

The primary objective of the present invention is to provide an auxiliary soldering tool that facilitates the soldering work of two wires, so that the worker can solder and connect the two wires easily and conveniently.

Another objective of the present invention is to provide an auxiliary soldering tool, wherein the soldering work is accomplished by a single worker, thereby facilitating the worker performing the soldering work.

A further objective of the present invention is to provide an auxiliary soldering tool, wherein the worker's hand is spaced away from the iron of the soldering device, thereby preventing the worker from being injured by the iron at a high temperature, so as to provide a safety effect.

In accordance with the present invention, there is provided an auxiliary soldering tool, comprising:

a first jaw plate, a second jaw plate, and two elastic press plates, wherein:

the first jaw plate has a first end integrally formed with a first holding portion and a second end integrally formed with a first holding portion;

the second jaw plate is pivotally mounted on the first jaw plate and has a first end integrally formed with a second holding portion and a second end integrally formed with a second holding portion; and each of the two press plates is respectively rested on the first holding portion of the first jaw plate and the second holding portion of the second jaw plate to move therewith.

Further benefits and advantages of the present invention will become apparent after a careful reading of the detailed description with appropriate reference to the accompanying drawings.

DETAILED DESCRIPTION OF THE INVENTION

Figure 1:
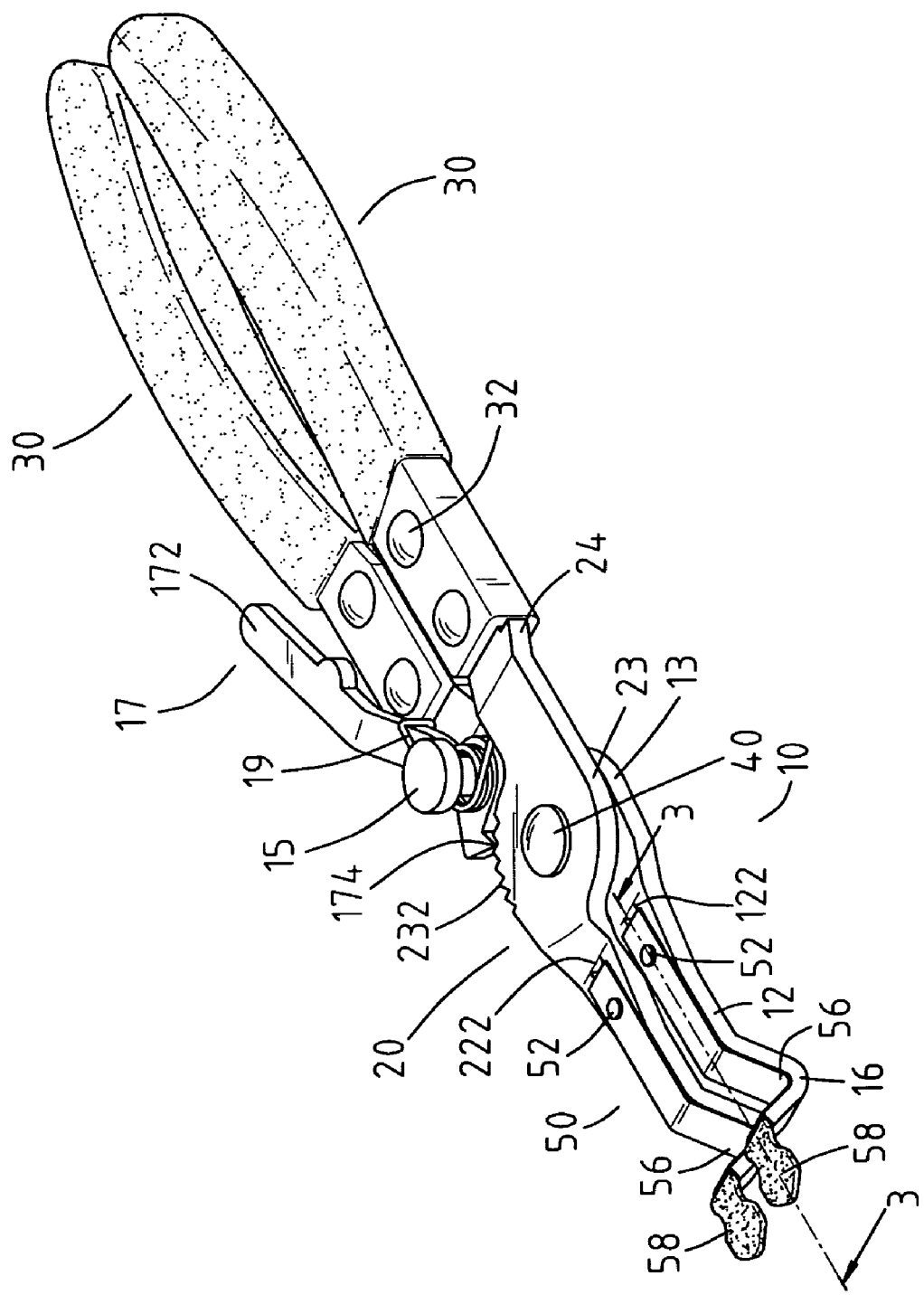
FIG. 1 is a perspective view of an auxiliary soldering tool in accordance with the preferred embodiment of the present invention.
Figure 2:
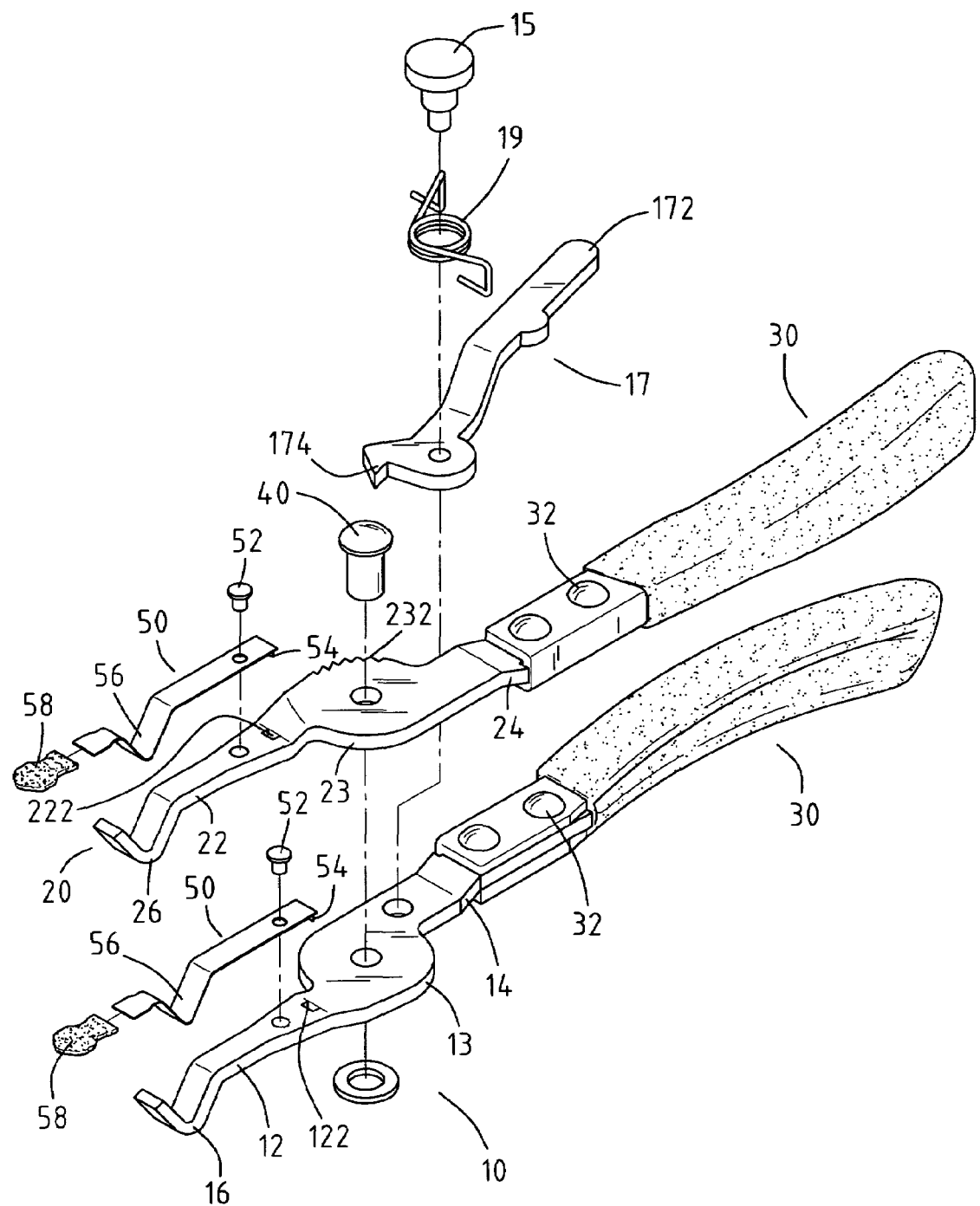
FIG. 2 is an exploded perspective assembly view of the auxiliary soldering tool in accordance with the preferred embodiment of the present invention.
Figure 3:
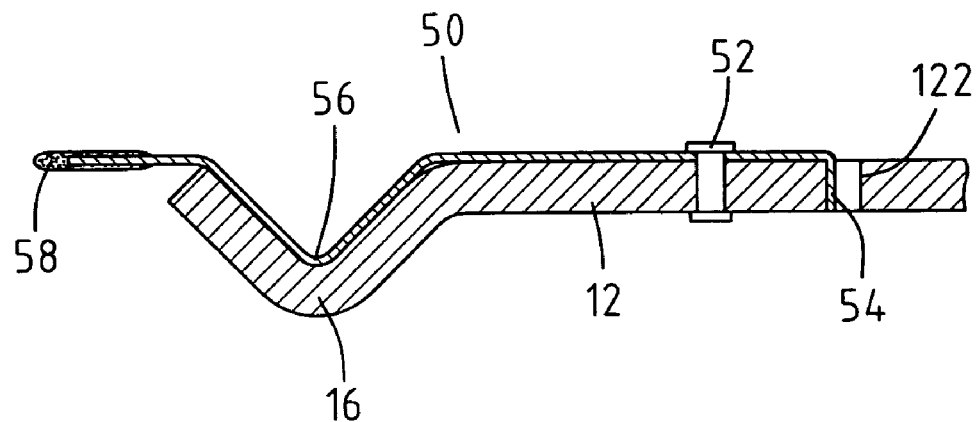
FIG. 3 is a plan cross-sectional view of the auxiliary soldering tool taken along line 3—3 as shown in FIG. 1.

Referring to the drawings and initially to FIGS. 1–3, an auxiliary soldering tool in accordance with the preferred embodiment of the present invention comprises a first jaw plate 10, a second jaw plate 20, two handles 30, and two elastic press plates 50.

The first jaw plate 10 has a first end integrally formed with a first holding portion 12, a mediate section integrally formed with a first disk 13 and a second end integrally formed with a first holding portion 14. The first holding portion 12 of the first jaw plate 10 has a distal end formed with a substantially V-shaped first support portion 16. The first holding portion 12 of the first jaw plate 10 is formed with an insertion hole 122 located adjacent to the first disk 13.

The second jaw plate 20 is pivotally mounted on the first jaw plate 10 and has a first end integrally formed with a second holding portion 22, a mediate section integrally formed with a second disk 13 pivotally mounted on the first disk 13 of the first jaw plate 10 and a second end integrally formed with a second holding portion 24. The second holding portion 22 of the second jaw plate 20 has a distal end formed with a substantially V-shaped second support portion 26. The second holding portion 22 of the second jaw plate 20 is formed with an insertion hole 222 located adjacent to the second disk 23.

The auxiliary soldering tool further comprises a pivot shaft 40 extended through the second disk 23 of the second jaw plate 20 and the first disk 13 of the first jaw plate 10, so that the second jaw plate 20 is pivotally mounted on the first jaw plate 10.

Each of the two handle 30 is mounted on the first holding portion 14 of the first jaw plate 10 and the second holding portion 24 of the second jaw plate 20 respectively.

Each of the two press plates 50 is respectively secured on the first holding portion 12 of the first jaw plate 10 and the second holding portion 22 of the second jaw plate 20 to move therewith. Preferably, each of the two press plates 50 is respectively mounted on the first holding portion 12 of the first jaw plate 10 and the second holding portion 22 of the second jaw plate 20 by a rivet 52.

Each of the two press plates 50 has a first end formed with a substantially V-shaped press portion 56 rested on the first support portion 16 of the first holding portion 12 of the first jaw plate 10 and the second support portion 26 of the second holding portion 22 of the second jaw plate 20 respectively. In addition, the first end of each of the two press plates 50 is provided with a catch gasket 58 to seal the gap defined between each of the two press plates 50 and the first holding portion 12 of the first jaw plate 10 and the second holding portion 22 of the second jaw plate 20 respectively, so that the two wires (not shown) are respectively clamped between each of the two press plates 50 and the first holding portion 12 of the first jaw plate 10 and the second holding portion 22 of the second jaw plate 20 rigidly and stably.

Each of the two press plates 50 has a second end formed with an insertion portion 54 inserted into the insertion hole 122 of the first holding portion 12 of the first jaw plate 10 and the insertion hole 222 of the second holding portion 22 of the second jaw plate 20 respectively.

In addition, the second disk 23 of the second jaw plate 20 has a periphery formed with a plurality of ratchet teeth 232, and the auxiliary soldering tool further comprises a snap plate 17 pivotally mounted on the first holding portion 14 of the first jaw plate 10 by a bolt 15 and located adjacent to the first disk 13 of the first jaw plate 10.

The snap plate 17 has a first end formed with a locking hook 174 engaged on the ratchet teeth 232 of the second disk 23 of the second jaw plate 20 and a second end formed with a push portion 172.

The auxiliary soldering tool further comprises a torsion spring 19 mounted on the bolt 15 and having a first end urged on the snap plate 17 and a second end urged on the first holding portion 14 of the first jaw plate 10, so that the locking hook 174 of the snap plate 17 is constantly engaged on the ratchet teeth 232 of the second disk 23 of the second jaw plate 20.

In operation, each of the two wires (not shown) has a distal end respectively clamped between the press portion 56 of each of the two press plates 50 and the first support portion 16 of the first holding portion 12 of the first jaw plate 10 and the second support portion 26 of the second holding portion 22 of the second jaw plate 20 respectively. Then, the user's one hand holds the two handle 30 to move the first holding portion 12 of the first jaw plate 10 toward the second holding portion 22 of the second jaw plate 20, so that the two wires are juxtaposed to each other. Then, the force applied on the two handle 30 is removed.

At this time, the locking hook 174 of the snap plate 17 is engaged on the ratchet teeth 232 of the second disk 23 of the second jaw plate 20, so that the first holding portion 12 of the first jaw plate 10 and the second holding portion 22 of the second jaw plate 20 cannot be moved outward relative to each other.

In such a manner, the two wires are juxtaposed to each other rigidly and stably without movement, so that the worker can operate auxiliary soldering tool, with his one hand holding the two handle 30 and with his other hand holding the soldering the soldering device (not shown) so as to perform the soldering work on the two wires for connecting the two wires by the soldering work.

Accordingly, the soldering work is accomplished by a single worker, thereby facilitating the worker performing the soldering work. In addition, the worker's hand is spaced away from the iron (not shown) of the soldering device, thereby preventing the worker from being injured by the iron at a high temperature, so as to provide a safety effect.

Figure 4:
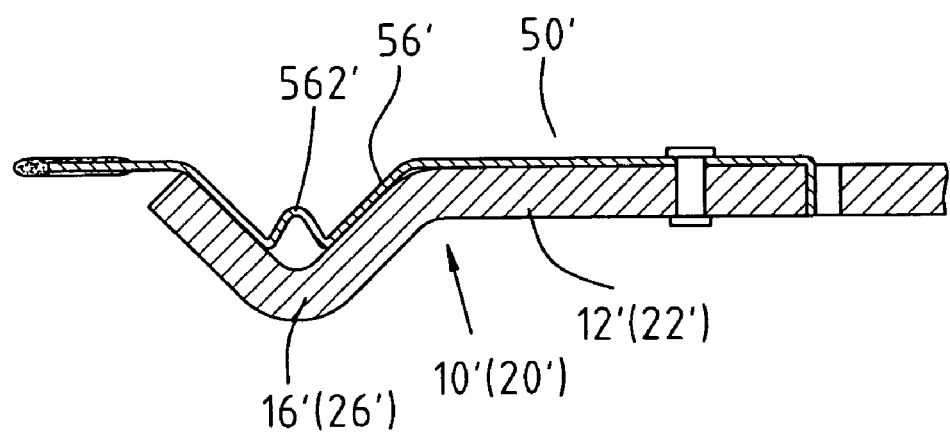
FIG. 4 is a plan cross-sectional view of an auxiliary soldering tool in accordance with another embodiment of the present invention.

Referring to FIG. 4, an auxiliary soldering tool in accordance with another embodiment of the present invention is shown, wherein the press portion 56' of each of the two press plates 50' is formed with an arc-shaped portion 562' aligning with the first support portion 16' of the first holding portion 12' of the first jaw plate 10' and the second support portion 26' of the second holding portion 22' of the second jaw plate 20' respectively, so that the two wires are clamped rigidly and stably.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An auxiliary soldering tool, comprising:
a first jaw plate, a second jaw plate, and two elastic press plates, wherein:
the first jaw plate has a first end integrally formed with a first holding portion and a second end integrally formed with a first holding portion, the first holding portion of the first jaw plate has a distal end formed with a substantially V-shaped first support portion;
the second jaw plate is pivotally mounted on the first jaw plate and has a first end integrally formed with a second holding portion and a second end integrally formed with a second holding portion, the second holding portion of the second jaw plate has a distal end formed with a substantially V-shaped second support portion; and
each of the two press plates has a first end formed with a substantially V-shaped press portion rested on the first support portion of the first holding portion of the first jaw plate and the second support portion of the second holding portion of the second jaw plate respectively.

2. The auxiliary soldering tool in accordance with claim 1, wherein the press portion of each of the two press plates is formed with an arc-shaped portion aligning with the first support portion of the first holding portion of the first jaw plate and the second support portion of the second holding portion of the second jaw plate respectively.

3. The auxiliary soldering tool in accordance with claim 1, wherein the first end of each of the two press plates is provided with a catch gasket to seal a gap defined between each of the two press plates and the first holding portion of the first jaw plate and the second holding portion of the second jaw plate respectively.

4. The auxiliary soldering tool in accordance with claim 1, wherein each of the two press plates is respectively mounted on the first holding portion of the first jaw plate and the second holding portion of the second jaw plate by a rivet.

5. The auxiliary soldering tool in accordance with claim 1, wherein the first holding portion of the first jaw plate is formed with an insertion hole, the second holding portion of the second jaw plate is formed with an insertion hole, and each of the two press plates has a second end formed with an insertion portion inserted into the insertion hole of the first holding portion of the first jaw plate and the insertion hole of the second holding portion of the second jaw plate respectively.

6. The auxiliary soldering tool in accordance with claim 1, wherein the first jaw plate has a mediate section integrally formed with a first disk, the second jaw plate has a mediate section integrally formed with a second disk pivotally mounted on the first disk of the first jaw plate.

7. The auxiliary soldering tool in accordance with claim 6, further comprising a pivot shaft extended through the second disk of the second jaw plate and the first disk of the first jaw plate, so that the second jaw plate is pivotally mounted on the first jaw plate.

8. The auxiliary soldering tool in accordance with claim 6, wherein the second disk of the second jaw plate has a periphery formed with a plurality of ratchet teeth, and the auxiliary soldering tool further comprises a snap plate pivotally mounted on the first holding portion of the first jaw plate and having a first end formed with a locking hook engaged on the ratchet teeth of the second disk of the second jaw plate.

9. The auxiliary soldering tool in accordance with claim 8, wherein the snap plate is pivotally mounted on the first holding portion of the first jaw plate by a bolt.

10. The auxiliary soldering tool in accordance with claim 9, further comprising a torsion spring mounted on the bolt and having a first end urged on the snap plate and a second end urged on the first holding portion of the first jaw plate, so that the locking hook of the snap plate is constantly engaged on the ratchet teeth of the second disk of the second jaw plate.

11. The auxiliary soldering tool in accordance with claim 8, wherein the snap plate is located adjacent to the first disk of the first jaw plate.

12. The auxiliary soldering tool in accordance with claim 8, wherein the snap plate has a second end formed with a push portion.

13. The auxiliary soldering tool in accordance with claim 1, further comprising two handles each mounted on the first holding portion of the first jaw plate and the second holding portion of the second jaw plate respectively.

14. An auxiliary soldering tool, comprising:
a first jaw plate, a second jaw plate, and two elastic press plates, wherein:
the first jaw plate has a first end integrally formed with a first holding portion and a second end integrally formed with a first holding portion, the first jaw plate has a mediate section integrally formed with a first disk;
the second jaw plate has a first end integrally formed with a second holding portion and a second end integrally formed with a second holding portion, the second jaw plate has a mediate section integrally formed with a second disk, the second disk of the second jaw plate having a periphery formed with a plurality of ratchet teeth, a pivot shaft extended through the second disk of the second jaw plate and the first disk of the first jaw plate, a snap plate pivotally mounted on the first holding portion of the first jaw plate and having a first end formed with a locking hook engaged on the ratchet teeth of the second disk of the second jaw plate; and
each of the two press plates is respectively rested on the first holding portion of the first jaw plate and the second holding portion of the second jaw plate to move therewith.

15. The auxiliary soldering tool in accordance with claim 14, wherein the first holding portion of the first jaw plate has a distal end formed with a substantially V-shaped first support portion, the second holding portion of the second jaw plate has a distal end formed with a substantially V-shaped second support portion, and each of the two press plates has a first end formed with a substantially V-shaped press portion rested on the first support portion of the first holding portion of the first jaw plate and the second support portion of the second holding portion of the second jaw plate respectively.

16. The auxiliary soldering tool in accordance with claim 15, wherein the press portion of each of the two press plates is formed with an arc-shaped portion aligning with the first support portion of the first holding portion of the first jaw plate and the second support portion of the second holding portion of the second jaw plate respectively.

17. The auxiliary soldering tool in accordance with claim 14, wherein the snap plate is pivotally mounted on the first holding portion of the first jaw plate by a bolt.

18. The auxiliary soldering tool in accordance with claim 17, further comprising a torsion spring mounted on the bolt and having a first end urged on the snap plate and a second end urged on the first holding portion of the first jaw plate, so that the locking hook of the snap plate is constantly engaged on the ratchet teeth of the second disk of the second jaw plate.

19. The auxiliary soldering tool in accordance with claim 14, wherein the snap plate has a second end formed with a push portion.

* * * * *